Feb. 25, 1969 E. J. POITRAS 3,429,429
COMPARTMENTED PACKAGE
Filed July 17, 1967 Sheet 1 of 2
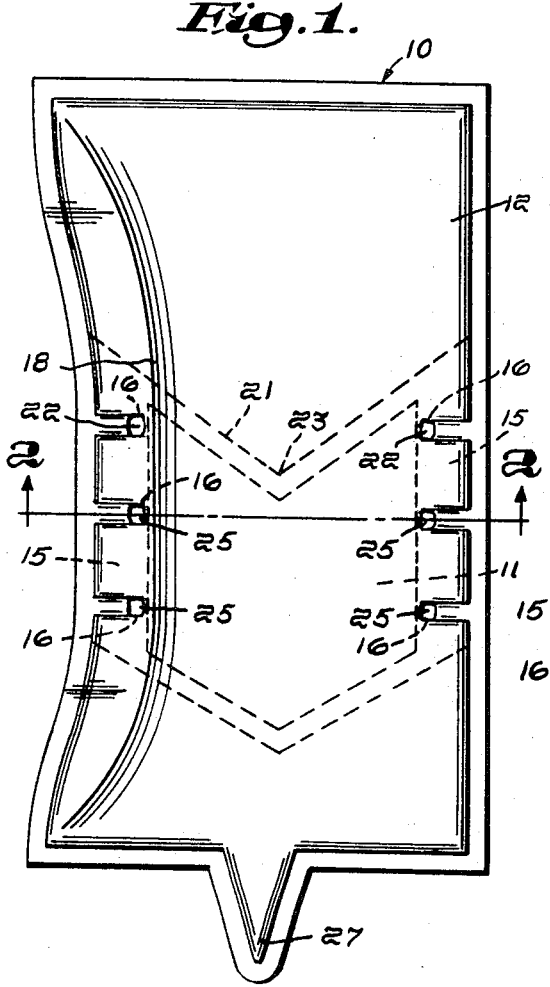
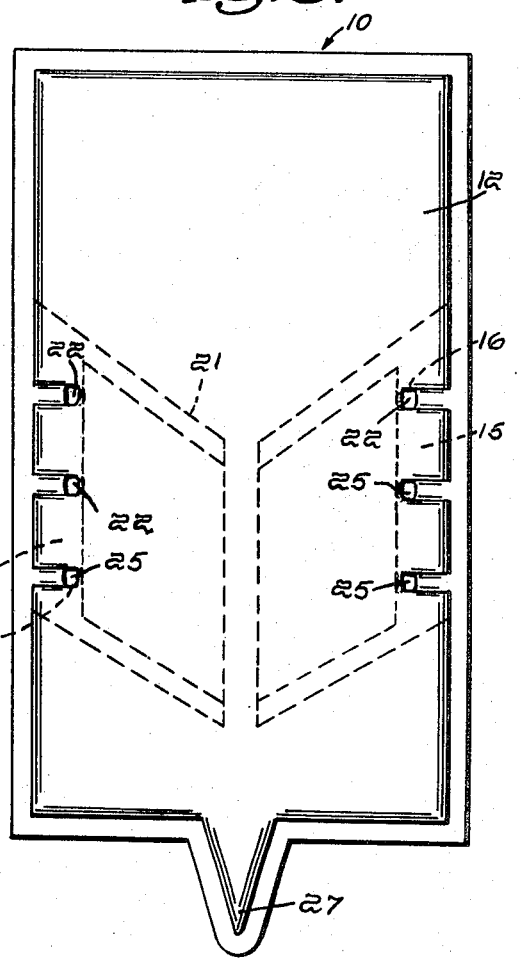
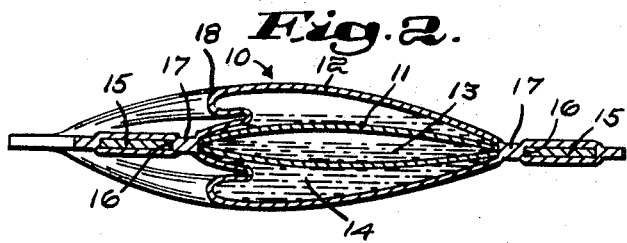
Inventor:
Edward J. Poitras,
by John E. Toupal
Attorney Feb. 25, 1969   E. J. POITRAS   3,429,429
COMPARTMENTED PACKAGE
Filed July 17, 1967   Sheet 2 of 2
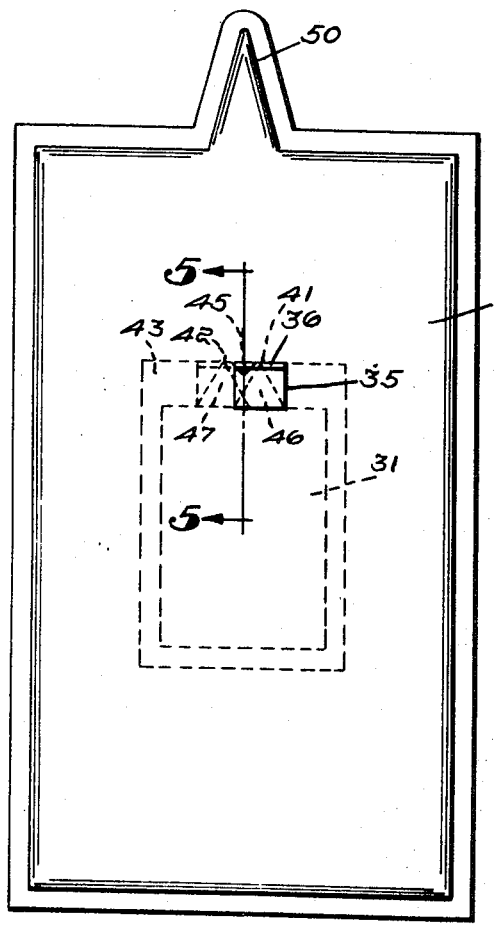
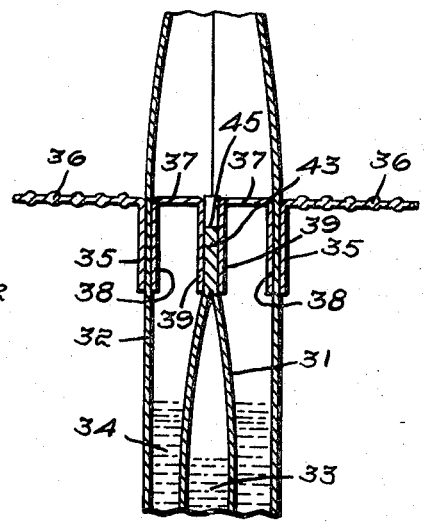
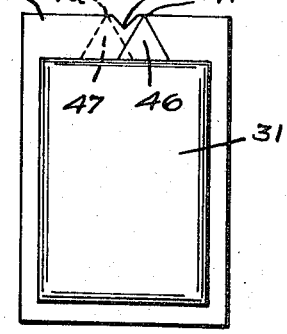
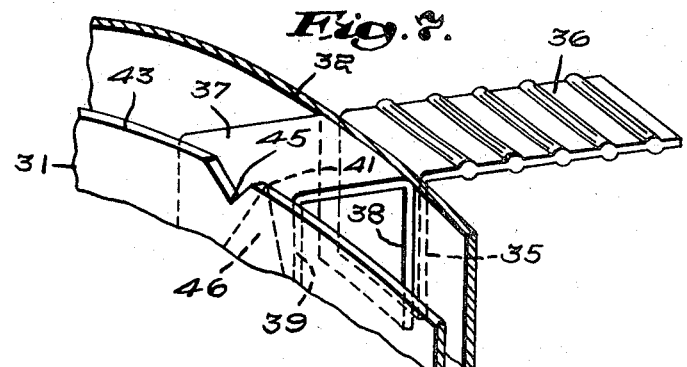
Inventor:
Edward J. Poitras,
by John E. Toupal
Attorney

United States Patent Office 3,429,429
Patented Feb. 25, 1969

3,429,429
COMPARTMENTED PACKAGE
Edward J. Poitras, 198 Highland St.,
Holliston, Mass. 01746
Filed July 17, 1967, Ser. No. 653,798
U.S. Cl. 206—47      11 Claims
Int. Cl. B65d 79/00

ABSTRACT OF THE DISCLOSURE

A compartmented package having a fluid filled storage container enclosed by and secured to gripping portions of a flexible walled receiving container. Because the receiving container wall portions connecting the gripping portions are of greater length than their separation, pulling apart of the gripping portions produces a rupturing force on the storage container walls while maintaining the receiving container walls intact.

---

This invention relates generally to material packages and, more particularly, to material packages having a plurality of isolated compartments.

There exist many applications wherein one desires initially to store one or more fluid substances in a sealed container and subsequently to somehow activate the fluid substance or substances without either physical contact therewith or exposure thereof to the surrounding environment. In some applications the activation step entails mixing of previously isolated fluid ingredients to form a desired activated mixture. Typical examples of these applications include the various combinations of liquid polymer base materials such as epoxies, polyurethanes, silicones, etc., with a suitable catalyst to form a hard setting fluid mixture useful in a wide variety of adhesive and cementing applications. Applications of this type are described, for example, in U.S. Patents Nos. 2,601,703; 3,064,802; and in the applicant's copending U.S. application Ser. No. 594,525 filed Nov. 15, 1966, and entitled, "Dispensing Method and Apparatus."

The mixing and use of such plural ingredients are somewhat complicated by a number of inherent factors. For example, since the activated ingredients generally harden rapidly, it is necessary that they be intermixed and utilized promptly after combination. Also, the ingredients generally must be isolated not only from each other but also from the atmosphere before and preferably during the mixing process. In addition, the required very thorough intermixing of the ingredients is made more difficult by the fact that the catalyst normally comprises a small fraction of the total fluid volume involved. For these reasons, it is desirable to have a unitary container in which the plural ingredients first can be separately stored and then thoroughly mixed before discharge and use.

Another multiple compartmented package related application involves the initial storing of a fluid substance within a sealed container which after activation produces a gradual and relatively constant dispersion of the substance to the surrounding environment. Such application includes the dispensing of various pesticides, air cleaners, perfumes, etc. Other suitable applications of this type are disclosed in the applicant's copending U.S. patent application Ser. No. 554,044, filed May 31, 1966, and entitled, "Compartmented Package."

The object of this invention, therefore, is to provide an improved, relatively low cost compartmented package for initially storing under sealed conditions one or more fluid ingredients and which permits activation of the one or more ingredients without exposure thereof to the surrounding environment.

One feature of this invention is the provision in a compartmented package of a sealed storage container filled with a fluid substance and at least partially enclosed by a sealed receiving container. The receiving container includes gripping portions fixed to the storage container so as to prevent relative movement therebetween and possesses between the gripping portions flexible wall portions which are of substantially greater length than the separation between the gripping portions. Pulling of the gripping portions in opposite directions exerts a rupturing force on the storage container thereby emptying the fluid substance into the receiving container which remains sealed because the elongated flexible wall portions permit separation of the gripping portions without rupture of the receiving container.

Another feature of this invention is the provision of a compartmented package of the above featured type wherein the storage container includes a wall portion adapted to easily rupture in response to the application of the pulling force. The use of a rupturable wall portion facilitates the ease with which the activating step can be accomplished.

Another feature of this invention is the provision of a compartmented package of the above featured type wherein the storage container is completely enclosed by the receiving container thereby simplifying the steps required for manufacturing of the completed package.

Another feature of this invention is the provision of a compartmented package of the above featured type wherein the storage container is a relatively flat pouch having opposite edges fixed to the receiving container gripping portions. The relatively flat pouch is particularly well suited for effecting a controlled rupture of the storage container and discharge of the fluid substance into the receiving container.

Another feature of this invention is the provision of a compartmented package of the above featured type wherein the rupturable wall portion is formed by a notch in an edge of the storing container joining the fixed opposite edges thereof and wherein the gripping portions extend above the apex of the notch. The mechanical leverage provided by this arrangement permits extremely simple initiation of a tear in the storage container at the base of the notch.

Another feature of this invention is the provision of a compartmented package of the above featured type wherein substantially the entire length of the opposite storage container edges are fixed to the receiving container gripping portions. This permits tearing of the storage container along an entire length thereby greatly facilitating the emptying of the fluid substance into the receiving container.

Another feature of this invention is the provision of a compartmented package of the above featured type wherein the relative movement between the storage container and receiving container gripping portions is prevented by clamps attached to the gripping portions and extending through apertures in sealed marginal portions of the storage container opposite edges.

Another feature of this invention is the provision of a compartmented package of the above featured type wherein the clamps are formed by heat sealing together adjacent wall portions of the receiving container through the apertures in the marginal portions of the storage container. Fixing of the receiving container gripping portions to the storage container is easily accomplished by this technique.

Another feature of this invention is the provision of a compartmented package of the above featured type wherein the receiving container contains a mixing ingredient adapted for mixing with the fluid substance after rupture and emptying of the storage container. This arrangement is for use in those applications requiring a combination of a plurality of fluid ingredients before exposure thereof to the surrounding environment.

Another feature of this invention is the provision of a compartmented package of the above featured type wherein the fluid substance and mixing ingredient include an epoxy resin and an activator therefor. These ingredients render the compartmented package particularly useful in a wide variety of sealing and strengthening applications.

These and other objects and features of the present invention will become more apparent upon a perusal of the following specification taken on conjunction with the accompanying drawings wherein:

FIG. 1 is a plan view of a preferred invention embodiment;

FIG. 2 is a cross-sectional view of the embodiment shown in FIG. 1 taken along the lines 2—2;

FIG. 3 is a plan view of the device shown in FIG. 1 after activation and mixing of the contained fluid substances;

FIG. 4 is a plan view of another invention embodiment;

FIG. 5 is a cross-sectional view of the embodiment shown in FIG. 4 taken along lines 5—5;

FIG. 6 is a plan view of the inner container of FIG. 4; and

FIG. 7 is an enlarged perspective view illustrating the connection between inner and outer containers of FIG. 4.

Referring now to FIGS. 1 and 2 there is shown the compartmented package 10 having the relatively flat storage container pouch 11 enclosed by the receiving container 12. The fluid substance 13 fills the storage container 11 preferably formed by peripherally sealed sheets of a tough and flexible light weight sheet material such as poly-Mylar laminate or similar synthetic material which is impervious to its fluid content. Similarly, container 12 is formed of a suitable lightweight, flexible sheet material such as a synthetic plastic and is sealed around its periphery to form a compartment containing both the storage container and the mixing ingredient 14. The sealed opposite marginal portions 15 of the storage container 11 possess a plurality of apertures 16. A notched portion 21 is provided in one edge of the storage container 11 joining the opposite marginal portions 15.

As shown in FIG. 2, wherein the sheet material thicknesses are greatly exaggerated for purposes of clarity, the clamps 17 extend through the apertures 16 in the storage container 11. The clamps 17 are formed by joined areas of the receiving container 12 walls lying adjacent the apertures 16 on opposite sides thereof. Preferably, the clamps 17 are formed by applying dielectric heating to the receiving container walls adjacent the apertures 16 so as to cause joining of the wall sections and formation of the clamps 17. However, prior to formation of the clamps 17, the mid-section of the receiving container 12 is contracted so as to distort its walls and form the bulges 18.

To activate the compartmented package 10 a user grasps the receiving container gripping portions lying adjacent the uppermost clamps 17 and pulls them in opposite directions. Because the clamps 17 fix the gripping portions 22 to the storage container 11 relative movement therebetween is prevented. Thus, a large shearing force is applied at the apex 23 of the notched edge 21 which induces tearing of the storage container walls. It will be noted that positioning of the gripping portions 22 above the level of the notch apex 23 provides a desirable mechanical advantage by concentrating all of the applied force at the notch apex 23. During the separation of the gripping portions 22, substantially no tensile force is applied to the walls of the receiving container 12 because of excess wall length provided by the bulges 18. For this reason, the walls of the receiving container 12 remain intact. After initial rupture of the storage container 11 similar pulling pressure is applied between the gripping portions 25 located adjacent the lower clamps 17. This produces additional pressure on the storage container 11 and results in its severance into two separate parts as shown in FIG. 3. The fluid substance 13 is then easily discharged into the still sealed receiving container 12 by, for example, applying pressure to the walls thereof. Subsequently, the discharged fluid substance 13 and fluid mixing ingredient 14 can be thoroughly mixed within the receiving container 12 by, for example, a kneading process. Upon completion of the mixing process, the receiving container spout 27 is severed with a suitable device and the combined fluid ingredients 13 and 14 dispensed by squeezing the walls of the receiving container.

In a preferred embodiment of the invention, the mixing ingredient 14 is a suitable epoxy resin and the fluid substance 13 is an activator therefor. Thus, upon opening of the storage container 11 and mixing of the fluid ingredients 13 and 14, an activated, settable fluid material is formed. Before hardening, this material can be discharged through the spout 27 and used in any of a wide variety of sealing and strengthening applications.

FIGS. 4–7 illustrate another invention embodiment having the sealed storage container 31 enclosed within the sealed receiving container 32. The storage container 31 is filled with a fluid substance 33 and the receiving container 32 contains a fluid mixing ingredient 34. Attached to gripping portions 35 on opposite sides of the receiving container 32 are the gnarled pull tabs 36. The U-shaped securing tabs 37 have outer legs 38 fixed to the inner surfaces of the gripping portions 35 and inner legs 39 fixed to opposite edges of the storage container 31. Preferably, the inner legs 39 are attached by triangularly shaped seals 46 and 47 having apexes 41 and 42 located at the edge 43 of the storage container 31 and slightly spaced apart thereon as shown in FIG. 6. A notch 45 is cut in the edge 43 between the apexes 41 and 42. Thus, upon separation of the pull tabs 36, the securing tabs 37 exert a concentrated tearing force on the storage container edge 43 at the base of the notch 45 between the seal apexes 41 and 42.

To activate the compartmented package shown in FIGS. 4–7 a user grasps the pull tabs 36 and pulls them in opposite directions. This produces between the seal apexes 41 and 42 at the base of notch 45 a shearing force which tears the storage container 31 walls. During this separation of the gripping portions 35, substantially no tensile force is applied to the walls of the receiving container 32 because the lengths of flexible receiving container wall portions joining the gripping portions 35 are substantially greater than the distance between them. For this reason, pulling on the pull tabs 36 merely deforms the receiving container 32 without tearing its walls. After opening of the storage container 31, the fluid substance 33 is easily discharged into the unopened receiving container 32 by, for example, applying pressure to the walls thereof. Subsequently, the discharged fluid substance 33 and fluid mixing ingredient 34 are mixed within the receiving container 32 and then dispensed through the severed discharge spout 50.

Obviously, many modifications and variations of the present invention are possible in light of the above teachings. For example only, although an epoxy resin and suitable activator therefor are preferred ingredients for use with the invention, it will be obvious that other suitable substances can be utilized or that the inner container could be filled with a single substance adapted to disperse through the walls of the outer container after opening of the inner. It is, therefore, to be understood that within the scope of the appended claims the invention can be practiced otherwise than as specifically described.

What is claimed is:

1. A compartmented package comprising a sealed storage container means containing a fluid substance, a sealed receiving container means at least partially enclosing said storage container means and adapted after opening of said storage container means to receive said fluid substance without exposure thereof to the surrounding environment, said receiving container means comprising gripping portions adapted to be gripped and pulled in opposite directions, securing means for fixing said gripping portions to said storage container means so as to prevent relative movement therebetween, said receiving container means having flexible wall portions joining said gripping portions, said storage container means comprising a pouch positioned within said receiving container means and having opposite edges fixed to said gripping portions, said pouch having a notched edge extending between said opposite edges, said gripping portions extending substantially above the apex of the notch in said notched edge, and wherein said flexible wall portions are of substantially greater length than the separation between said gripping portions thereby allowing separation of said gripping portions so as to apply a rupturing force on said storage container means at said notch apex while applying substantially no force to said flexible wall portions.

2. A compartmented package according to claim 1 wherein said receiving container contains a mixing ingredient adapted for mixing with said fluid substance after rupture of said storage container means.

3. A compartmented package according to claim 2 wherein said fluid substance and said mixing ingredient comprise an epoxy resin and an activator therefor.

4. A compartmented package according to claim 1 wherein the depth of said notch is substantial compared to the full length of said notched edge.

5. A compartmented package according to claim 4 wherein said notch extends across substantially the full length of said notched edge.

6. A compartmented package according to claim 4 wherein said receiving container contains a mixing ingredient adapted for mixing with said fluid substance after rupture of said storage container means.

7. A compartmented package according to claim 6 wherein said fluid substance and said mixing ingredient comprise an epoxy resin and an activator therefor.

8. A compartmented package comprising a sealed storage container means containing a fluid substance, a sealed receiving container means containing a mixing ingredient adapted for mixing with said fluid substance, said receiving container means adapted after opening of said storage container means to receive said fluid substance without exposure thereof to the surrounding environment, said receiving container means comprising gripping portions adapted to be gripped and pulled in opposite directions, securing means for fixing said gripping portions to said storage container means so as to prevent relative movement therebetween, said receiving container means having flexible wall portions joining said gripping portions, said storage container means comprising a pouch enclosed within said receiving container, said gripping portions being substantially centrally located on opposite wall surfaces of said pouch, said securing means attaching said gripping portions to positions on an edge of said storage container means, and wherein said flexible wall portions are of substantially greater length than the separation between said gripping portions thereby allowing separation of said gripping portions so as to apply a rupturing force on said storage container means while applying substantially no force to said flexible wall portions.

9. A compartmented package according to claim 8 wherein said attachment positions on an edge of said storage container means are of relatively small area so as to concentrate the tearing force applied to said storage container means upon separation of said gripping portions.

10. A compartmented package according to claim 8 wherein said attachment positions are slightly spaced apart along said edge of said storage container means.

11. A compartmented package according to claim 10 wherein said edge of said storage container means possesses a notched region between attachment portions.

References Cited
UNITED STATES PATENTS

| | | | |
|---|---|---|---|
| 2,552,870 | 5/1951 | Scherer | 229—66 |
| 2,771,724 | 11/1956 | Hosier et al. | 206—47 |
| 2,899,347 | 8/1959 | Kindseth | 206 |
| 3,085,681 | 4/1963 | Fazzari | 206—47 |
| 3,255,872 | 6/1966 | Long et al. | 206—47 |
| 3,343,664 | 9/1967 | Poitras | 206—47 |

WILLIAM T. DIXSON, JR., *Primary Examiner.*